M. GARSIDE.
HORSE BOOT.
APPLICATION FILED JAN. 11, 1911.

1,010,745.

Patented Dec. 5, 1911.

WITNESSES:
Clifford A. Alliston
Regina A. Hanna

INVENTOR
Melvin Garside.
BY
Fred'k C. Fischer.
ATTORNEY 1,010,745. HORSE-BOOT. MELVIN GARSIDE, Paterson, N. J. Filed Jan. 11, 1911. Serial No. 601,994.

*To all whom it may concern:*

Be it known that I, MELVIN GARSIDE, a citizen of the United States, residing in the city of Paterson, in the county of Passaic and State of New Jersey, have invented certain new and useful Improvements in Horse-Boots, of which the following is a full, clear, and exact description, such as will enable others skilled in the art to which it pertains to make and use the same, reference being had to the accompanying drawings, and to letters of reference marked thereon, forming a part of this specification.

The invention which relates to improvements in attachments for horse shoes, comprises a boot for horses formed in two sections, each section carrying calks thereon, which sections are rendered relatively adjustable by means of a bolt and nut structure, to be hereinafter described.

The object of the invention is to provide a thoroughly efficient attachment capable of being conveniently applied to a horse shoe nailed on the hoof of a horse for use in preventing the horse from slipping on ice-covered streets.

The attachment of my invention, in its preferred construction, is adjustable to the shoe and hoof of the horse, so that it may be applied to shoes and hoofs varying in size and shape.

Figure 1:
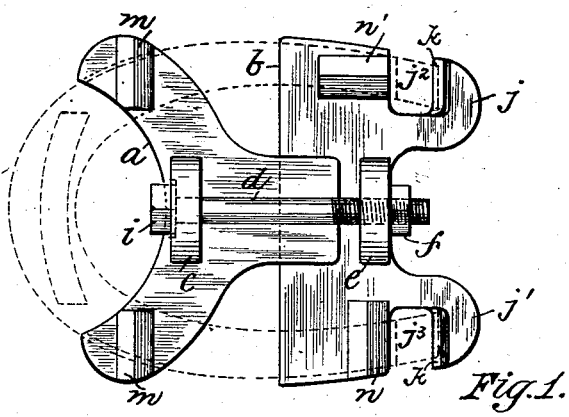
Figure 2:
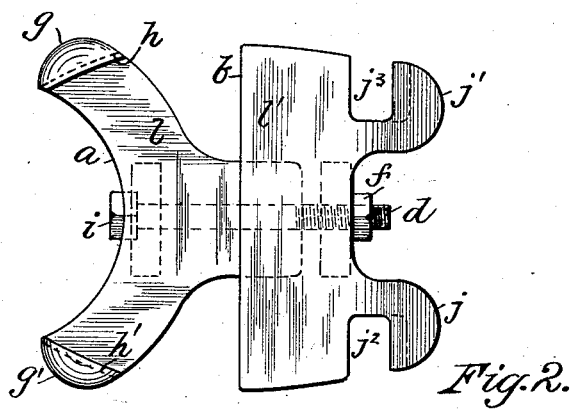
Figure 3:
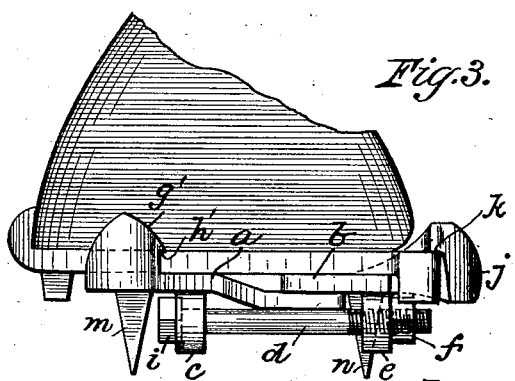

The invention will be fully understood from the detailed description hereinafter presented, reference being had to the accompanying drawings, in which Figure 1 represents a bottom plan view of the improved horse boot, showing the bolt and nut connection between the front and rear sections of the device. Fig. 2 represents a top plan view of the same; and Fig. 3 represents a side elevation of the device, attached to the shoe and hoof of a horse, with one of the side calks removed.

Similar letters of reference refer to like parts throughout the specification and drawings.

In the drawings, $a$ represents the front section of the horse boot, the forward ends of which form an inverted arch, the main body portion extending rearwardly and bearing against the under side of the rear section $b$. The front section $a$ has a downwardly and rearwardly projecting tongue integrally formed therewith, which tongue is flattened on both sides, and upon which the main body portion of the rear section $b$ bears. Located centrally on the front section $a$ is a downwardly projecting lug $c$ preferably formed integral with said section and having an opening therein, through which opening a screw-threaded bolt $d$ is inserted, which bolt also passes through an opening in a similar lug $e$ also centrally located, on the rear section $b$. The front lug $c$ is countersunk to receive the head $i$ of the bolt $d$ and prevents it from turning. The sections $a$ and $b$ are secured against accidental separation by means of the screw-threaded nut $f$, which is screwed on the bolt $d$, and by adjusting the bolt in either direction, the sections $a$ and $b$ are rendered relatively adjustable, and thus can be made to fit different sizes and shapes of horseshoes.

$g$ and $g'$ represent projections formed integral with the front section $a$, which projections are formed at the time of making the boot, in the same manner as the toe plate of an ordinary horse shoe is made, and for that reason, cannot become separated from the section $a$. These projections extend upwardly and rearwardly from the front section $a$, and have grooves $h$ and $h'$ formed in their base, into which grooves, the edge of the ordinary horse shoe fits, and such projections, above the grooves, fit closely against the hoof of the horse.

Extending upwardly from the main body portion of the rear section $b$ and integral therewith, are the locating members $j$ and $j'$, between which and the main body portion of the section $b$ are openings $j^2$ and $j^3$ for receiving the heel calks of the ordinary horse shoe. When the heel calks are in position in the said openings, the flange $k$, when the bolt $d$ is turned so as to adjust the sections $a$ and $b$, will fit snugly against the top part of the shoe above the heel calk of the horse shoe, thereby locating the boot on the shoe.

When the boot is in position, the main body portions of both sections present flat bearing surfaces $l$ and $l'$, upon which the flat part of the bottom of the horse shoe presses, thus presenting a broad surface for nearly the entire horse shoe to rest upon, and one which will not be injured by any use to which a boot or shoe of this character is ordinarily subjected.

Longitudinally secured to each end of the inverted arch of the front section $a$, is a toe calk $m$ of the ordinary form, which can be secured in any suitable manner to the under side of the boot, but preferably in the manner common in devices of this character, namely, by welding at the time of making the boot. Heel calks $n$ and $n'$ are integrally secured to the main body portion of the rear section $b$, the calk $n$ being secured laterally to the body portion, while the calk $n'$ is longitudinally secured to the body portion, as shown in Fig. 1, to prevent the horse from slipping sidewise at the end of each step.

Experience has demonstrated that the organization above described, is a highly efficient one, and while the device described is the preferred embodiment of my present invention, I do not care to restrict myself to the exact details of construction, combination, and arrangement herein set forth, it being obvious that minor variations thereof not involving the exercise of invention may be made by any skilled mechanic, and such departures from what is herein described and claimed not involving invention, I consider as within the scope and terms of my claims.

I claim:

1. A horse boot comprising front and rear sections extending across the lower surface of the shoe, calks on each section, one calk on the rear section being oppositely arranged to the calks on said front and rear sections, an integral tongue projecting downwardly and rearwardly from said front section and engaging with the under surface of the rear section to permit said section to bear thereon, the rear section being of a width corresponding to the width of the shoe to which it is applied to furnish a support for said shoe, alined integral lugs on the under side of each section, and a screw-threaded bolt passing through said lugs, thereby enabling an adjustment of the sections to and from each other.

2. A horse boot comprising front and rear sections extending across the lower surface of the shoe, calks on each section, one calk on the rear section being oppositely arranged to the calks on said front and rear sections, upwardly extending hoof engaging means on the front section, and upwardly extending means for engaging the heel calks on the rear section, an integral tongue projecting downwardly and rearwardly from the front section and engaging the under side of the rear section, alined integral lugs on the under side of each section, and a screw-threaded bolt passing through said lugs, thereby enabling an adjustment of the sections to and from each other.

This specification signed and witnessed this sixth day of January, 1911.

MELVIN GARSIDE.

Witnesses:
 FREDK. C. FISCHER,
 C. A. ALLISTON.